Figure 1:
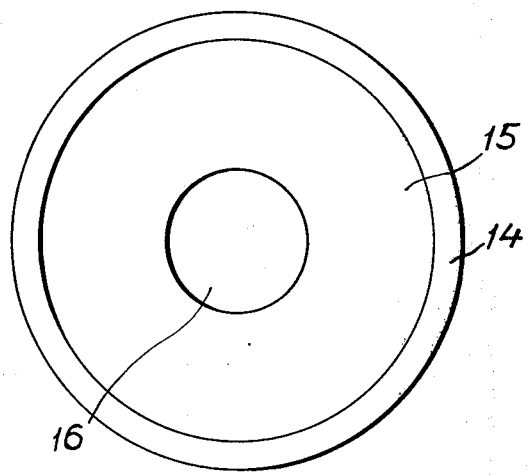

United States Patent [19]
Lindstrom et al.

[11] 3,904,391
[45] Sept. 9, 1975

[54] METAL-COATED DIAMONDS IN SYNTHETIC RESIN BONDED GRINDING WHEELS

[75] Inventors: Olle Lindstrom, Vasteras; Erik Lundblad, Robertsfors, both of Sweden

[73] Assignee: Allmanna Svenska Elektriska Aktiebolaget, Vasteras, Sweden

[22] Filed: Mar. 29, 1966

[21] Appl. No.: 538,335

Related U.S. Application Data
[63] Continuation-in-part of Ser. No. 497,810, Oct. 19, 1965, abandoned.

[52] U.S. Cl. .................................... 51/295; 51/298
[51] Int. Cl.[2] ...................... C09K 3/14; C23C 5/00
[58] Field of Search ............ 51/298, 307, 309, 295, 51/293; 23/209.1 D

[56] References Cited
UNITED STATES PATENTS

| | | | |
|---|---|---|---|
| 1,142,688 | 9/1957 | France | 51/309 |
| 3,087,803 | 4/1963 | Bakian | 51/298 |
| 3,125,418 | 3/1964 | Wentorf | 23/209.1 |

*Primary Examiner*—Donald J. Arnold
*Attorney, Agent, or Firm*—Brumbaugh, Graves, Donohue & Raymond

[57] ABSTRACT

Diamond grains coated with a metallic coating of a thickness of 0.5–25 microns are embedded in a synthetic resin to form a grinding material.

10 Claims, 2 Drawing Figures

PATENTED SEP 9 1975  3,904,391

INVENTOR.
OLLE LINDSTRÖM AND ERIK LUNDBLAD
BY
Bailey, Stephens & Huettig
ATTORNEYS

METAL-COATED DIAMONDS IN SYNTHETIC RESIN BONDED GRINDING WHEELS

This application is a continuation-in-part of our application Ser. No. 497,810, filed Oct. 19, 1965 and now abandoned.

The present invention relates to diamonds coated with a metallic material, to a method of manufacturing such diamonds, to a grinding material comprising diamonds coated with a metallic material and embedded in a resin bond, to a method of manufacturing such grinding material, to diamonds for use in resin-bonded grinding wheels, to a method of preparing diamonds for use in manufacturing resin-bonded grinding wheels and to resin-bonded grinding wheels containing such diamonds.

A problem with grinding wheels containing diamond grits as abrasive has been that the abrasive is easily damaged during or after its embedment in the wheel matrix. Another problem has been to ensure that these grits will remain fixed when subjected to high loads and/or high temperatures. If, for example, untreated diamond grits, e.g. in the form of synthetic diamonds having a grit size of 420 microns at the most, are embedded in the bond, the binding force obtained between the diamond grits and the resin bond will be insufficient. Furthermore, the individual grits will be subjected to excessive heat. There is a risk, among other things, that the grits will become detached or fracture during the use of the wheel, partly on account of insufficient initial binding strength, partly because there is nothing to hold the fractured parts together and partly because damage may occur in the interfaces between the grits and the resin bond.

These and other associated problems are solved by the use of diamonds prepared according to the invention. The diamond grits are coated with a layer of metallic material with a thickness of between 0.5 $\mu$ and 155 $\mu$, suitably between 0.5 $\mu$ and 25 $\mu$ and preferably between 5 $\mu$ and 20 $\mu$. In a preferred form, the diamond grits, for example synthetic diamonds having a grit size of 420 microns at the most, are coated with a layer, the thickness of which is between 10 $\mu$ and 15 $\mu$. The layer consists essentially of one or more of the metals nickel, cobalt, silver, copper, molybdenum, titanium, aluminium, manganese, cadmium, tin, lead, zinc, chromium, gold, tungsten, indium, iron, zirconium, platinum group metals such as platinum, rhodium, palladium, or alloys or mixtures containing at least one of these metals, for example, tin-nickel. Such a layer, which can be applied in one of several ways, forms a continuous mechanically strong shell around the diamond grit. This shell is able to keep together splinters which may be formed in the diamond grit. Furthermore, the bonding surface towards the resin bond is enlarged, and the heat developed during the grinding will be transferred from the grits over a larger mass, thus preventing extreme temperature peaks in the grits and also thermally induced ageing effects in the resin bond. It should be noted that the layer must be at least 0.5 $\mu$ thick, which means many times greater than a molecular layer, in order to obtain the advantages dealt with here.

Grinding wheels containing such diamond grits have, in comparison with those containing unprepared diamond grits, a better grinding performance and a longer life. The grinding efficiency of a wheel is often defined in terms of the "grinding ratio" which is the ratio between the volume of the material ground and the volume of grinding-wheel material worn away. It has been shown that grinding wheels containing diamond grits prepared according to the invention will give an essentially larger grinding ratio than those containing untreated diamond grits. Moreover, an even higher grinding ratio is obtained within the layer thickness range 0.5 $\mu$ to 25 $\mu$. It has also been shown that there is an optimum region between 5 $\mu$ and 20 $\mu$. Layers with a thickness of between 10 $\mu$ and 15 $\mu$ have been shown to be particularly favourable for wet grinding.

In the accompanying figures,

FIG. 1 shows a peripheral grinding wheel according to the invention and

Figure 2:
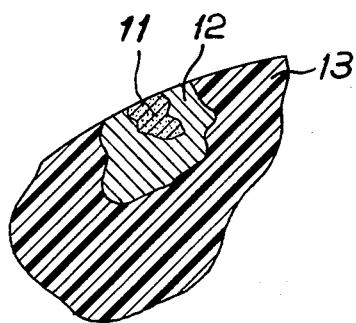

FIG. 2 an enlarged detail of the same wheel.

Synthetic diamonds of grit size 40 mesh at the most (which means that the grits shall pass through a wire screen of 420 microns opening), preferably 80 mesh at the most (which means that the grits shall pass through a wire screen of 177 microns opening), can be coated in different ways with a layer of metallic material consisting of nickel, cobalt, silver, copper, molybdenum, titanium, aluminium, or of the other metals listed above or of alloys or mixtures containing at least one of these metals. As examples of how such layers can be coated the following can be mentioned.

EXAMPLE 1

Nickel is reduced on diamond grits of 140 mesh - 170 mesh size in an autoclave under hydrogen at a pressure of 20 atm from an aqueous solution of a nickel salt containing 230 g/l $NiSO_4 \cdot 6 H_2O$, 300 g/l $(NH_4)_2SO_4$ and 130 ml concentrated aqueous ammonia/l, the diamonds being dispersed in the solution. The autoclave is equipped with a stirrer and the reduction takes place at a temperature of 160° – 170°C. The reduction is started by adding small amounts of a catalyst such as anthraquinone. The treatment is repeated until the thickness of the layer has reached the desired value, say 100 $\mu$.

An example of a method of coating diamond grits with a layer consisting of several metals is given in the following.

EXAMPLE 2

A mixture of cobalt and nickel is precipitated by reduction from an ammoniacal solution of cobalt, nickel and ammonium sulphates on diamond grits (100 mesh – 120 mesh) activated with palladium chloride in the same way as described in Example 3. A reaction vessel is filled with a solution containing per liter: 300 g/ $(NH_4)_2SO_4$, 140 g $CoSO_4 \cdot 7 H_2O$, 90 ml concentrated aqueous ammonia and $NiSO_4 \cdot 6 H_2O$. This yields a concentration of 9 g nickel/l. Hydrogen is conveyed into this solution, in which the activated diamond grits have been placed, under a pressure of 13.5 atm. at a temperature of 200°C – 210°C. After 150 min a cobalt-nickel coating is obtained on the diamond grits. The layer is about 5 $\mu$ thick, and consists of 39.0 percent Co and 4.3 percent Ni by weight of diamond.

The coating of the diamond grits can also be made by chemical reduction in other ways, for example, by "electroless" plating. The following example of coating by chemical reduction can be mentioned:

EXAMPLE 3

25 carats of diamond grits of 40 mesh – 60 mesh are cleaned in a mixture of equal parts of concentrated nitric acid and hydrochloric acid and rinsed thoroughly in distilled water, whereupon they are activated for 10 min each in the following two aqueous solutions: 5 g $SnCl_2$ + 10 ml HCl)l and 0.2 g $PdCl_2$ + 1 ml HCl/l. The activated diamonds are then dipped at a temperature of 70°C in an aqueous solution containing 30 g/l $NiSO_4$ . 7 $H_2O$, 10 g/l $NaOCOCH_3$ . 3 $H_2O$ and 10 g/l $NaH_2PO_2$ . $H_2O$. The acidity is adjusted to pH 5 with $CH_3COOH$.

A method of coating differing from those described above is obtained by electrolytical deposition of the metals. An example of nickel plating according to this treatment is the following:

EXAMPLE 4

Synthetic diamond grits of 80 mesh – 100 mesh are cleaned by boiling in concentrated $HNO_3$ and rinsed in distilled water. The diamond grits are then silvered by reduction of silver from an ammoniacal solution of silver nitrate and a reducing agent, for example according to Brashear, Handbook of Chemistry and Physics, 44th edition. The thickness of the layer obtained is less than 0.25 $\mu$. The object of the silvering is to make the diamond grits electrically conducting. The thickness of the layer can range from molecular layers to some tenths of a micron. 75 carats of the silvered diamond grits are transferred to a rotatable cylindrical drum, containing an aqueous solution of $NiSO_4$ . 6 $H_2O$ (140 g/l), $NH_4Cl$ (30 g/l), $H_3BO_3$ (30 g/l). A nickel anode is placed above the diamond grits, while the cathode is connected to the drum containing the diamond grits. The current is switched on and the current density is adjusted so that a value of about 20 mA/cm$^2$ area of the top layer of the diamond grits facing the anode is obtained. The drum is rotated at a speed of 1 – 2 r.p.m. The electrolysis is continued for about 24 hours, whereupon the diamond grits are removed, rinsed and dried. The thickness of the layer is by then 25 $\mu$.

Instead of silvering, the diamond grits can be coated with a conducting layer of another metal, which can be precipitated, vaporised or applied in some other way. Examples of such layers are gold, platinum group metals such as platinum or palladium, copper, nickel, aluminum, cobalt, graphite or other metals with good electrical conductivity.

When using a conducting layer, according to the invention this layer suitably has a thickness in the range from a molecular layer to about 5 microns and preferably in the range from a molecular layer to about 1 micron.

Instead of the current density value exemplified above, other current densities of at least 10 mA/cm$^2$ area of the top layer of the diamond grits facing the anode may be used for applying the outer layer, preferably accompanied by stirring. These current densities may be used for most types of electrolytes when depositing the outer layer of different metallic materials according to the invention.

The diamond grits prepared according to the invention, e.g. according to any of the Examples, can be used for manufacturing e.g. resin-bonded grinding wheels. A resin-bonded wheel is shown in FIG. 1. The diamond section 14, which is the part of the grinding wheel containing the diamonds bonded with the resin, is about 3 mm wide and about 6 mm thick and is fixed to a metallic material, e.g. a light metal, or bakelite hub 15 provided with a hole 16.

A resin containing a filler is mixed with coated diamond grits and cold pressed and then heated to a suitable curing temperature in a mould until the resin is cured. The following example can be given.

A suitable resin bond is prepared from a phenolic resin of the novolak type (1.2 moles phenol per mole formaldehyde) containing 16 parts by weight hexamethylene tetramine and 100 parts by weight of novolak, which is heated to 110°C, whereupon it is crushed and mixed with a filler such as silicon carbide and some calcium oxide (resin 38.8 per cent by weight, calcium oxide 1.2 per cent by weight, silicon carbide 600 mesh, 60 per cent by weight). In order to manufacture a 100-cencentration diamond grinding wheel, metal-coated diamond grits are added so that the concentration of diamond grits calculated as untreated diamonds will be 72 carats/in$^3$ of the diamond section.

The mixture is moulded at a temperature of about 160° for half an hour by which time the resin is cured. The wheel obtained is then removed from the mould and given a final cure at a temperature of 150°C for 24 hours and machined to shape.

Other phenolic resins, e.g. of novolak and resol type, mixed with fillers may be used instead of the type of resin mentioned above.

Other resinous binders with or without a filler can be used as well, such as epoxy resins, polyimides, alkyd resins, unsaturated polyester resins, silicones, polybenzinimidazoles, polyamidimides, etc. whether the diamonds are used for manufacturing diamond wheels or other resin-bonded grinding materials. By using fillers the amount of filler is suitably 30 to 85, preferably 40–80, per cent by weight of the total amount of resin and filler. Besides silicon carbide other fillers may be used such as corundum and boron carbide.

The concentration of diamonds calculated as untreated diamond grits can be varied between the limits 1.0 – 9.0 carats per cm$^3$ of the diamond section, preferably 2.2 – 4.4 carats per cm$^3$. One carat is 0.2 g.

FIG. 2 shows part of the diamond section of a peripheral wheel with diamond grits 11, coated with a metal layer such as nickel 12, embedded in a cured phenolic resin 13 of the above described novolak type.

The method and grinding wheel according to the invention can be varied in many ways within the scope of the following claims.

We claim:

1. A grinding wheel having a hub portion and a diamond section secured on the hub portion, said diamond section comprising a body of cured synthetic resin bond having embedded therein diamonds coated with a layer of metallic material, said layer having a thickness of between 0.5 and 25 microns.

2. A grinding wheel as claimed in claim 1, said metallic material consisting essentially of nickel.

3. A grinding wheel as claimed in claim 1, said layer having a thickness of between 5 and 20 microns.

4. A grinding wheel as claimed in claim 1, said layer having a thickness of between 10 and 15 microns.

5. A grinding wheel as claimed in claim 1, in which said resin bond is a phenolic resin.

6. A grinding material comprising a body of cured synthetic resin bond having embedded therein diamonds coated with a layer of metallic material, said layer having a thickness of between 0.5 and 25 microns.

7. A grinding material as claimed in claim 6, said layer having a thickness of between 5 and 20 microns.

8. A grinding material as claimed in claim 6, said layer having a thickness of between 10 and 15 microns.

9. A grinding material as claimed in claim 6, said metallic material consisting essentially of nickel.

10. A grinding material as claimed in claim 6, in which said resin bond is a phenolic resin.

* * * * *